United States Patent
Krishnamurthi (10) Patent No.: US 11,535,143 B2
(45) Date of Patent: Dec. 27, 2022

(54) PROVIDING ROADSIDE ASSISTANCE TO VEHICLES

(71) Applicant: GM Cruise Holdings LLC, San Francisco, CA (US)

(72) Inventor: Govindarajan Krishnamurthi, Palo Alto, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 428 days.

(21) Appl. No.: 16/729,764

(22) Filed: Dec. 30, 2019

(65) Prior Publication Data
US 2021/0197702 A1    Jul. 1, 2021

(51) Int. Cl.
| | | |
|---|---|---|
| G05D 1/02 | (2020.01) | |
| B60P 3/07 | (2006.01) | |
| G06Q 10/00 | (2012.01) | |
| G08G 1/00 | (2006.01) | |
| G07C 5/08 | (2006.01) | |

(52) U.S. Cl.
CPC .............. *B60P 3/07* (2013.01); *G05D 1/0295* (2013.01); *G06Q 10/20* (2013.01); *G07C 5/0808* (2013.01); *G08G 1/202* (2013.01); *G05D 2201/0213* (2013.01)

(58) Field of Classification Search
CPC . B60P 3/07; G05D 1/0295; G05D 2201/0213; G06Q 10/20; G07C 5/0808; G08G 1/202
See application file for complete search history.

(56) References Cited

U.S. PATENT DOCUMENTS

| | | | |
|---|---|---|---|
| 2016/0071418 A1* | 3/2016 | Oshida | G05D 1/0295 701/23 |
| 2016/0321674 A1* | 11/2016 | Lux | G06Q 30/016 |
| 2017/0004661 A1* | 1/2017 | Winiecki | G07C 5/006 |
| 2018/0237012 A1* | 8/2018 | Jammoussi | G01C 21/3415 |
| 2019/0188635 A1* | 6/2019 | High | G08G 1/205 |
| 2019/0197497 A1* | 6/2019 | Abari | G05D 1/0088 |
| 2020/0173795 A1* | 6/2020 | Hardee | G01C 21/3415 |
| 2020/0276989 A1* | 9/2020 | Garcia | B62D 15/025 |
| 2021/0179105 A1* | 6/2021 | Kim | B60W 30/165 |

FOREIGN PATENT DOCUMENTS

WO    WO-2017018743 A1 *    2/2017    ............. G06Q 10/20

\* cited by examiner

*Primary Examiner* — Calvin Cheung
(74) *Attorney, Agent, or Firm* — Polsinelli PC (57) ABSTRACT

Systems and methods provide for enabling an autonomous vehicle to provide road assistance to a vehicle. The autonomous vehicle can analyze sensor data about the vehicle captured by one or more of its sensors as it navigates a route. Based on the analysis of the sensor data, the autonomous vehicle can determine that the vehicle needs maintenance. The autonomous vehicle can proactively send a request, based on the determination, to initiate a towing mechanism to tow the vehicle. Based on receiving an acceptance of the request from the vehicle, the autonomous vehicle can activate the towing mechanism.

17 Claims, 6 Drawing Sheets

PROVIDING ROADSIDE ASSISTANCE TO VEHICLES

TECHNICAL FIELD

The subject matter of this disclosure relates in general to the field of roadside assistance vehicles, and more particularly, to systems and methods for an autonomous towing vehicle providing assistance to vehicles.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Currently, a human operator of a towing vehicle needs to receive a call for assistance from a vehicle (or the human operator must recognize a vehicle) In order to drive that vehicle to safety and/or into a shop when it is deemed as needing repair. The human operator of the towing vehicle must then direct the vehicle to a garage. This can be a time consuming, error-prone, and potentially dangerous process, especially as autonomous vehicles without human operators enter the roadways. The vehicle may not have a human operator that could provide the necessary human intervention to place a call for help and/or help a towing vehicle attach a towing mechanism to the vehicle. The towing vehicle may not have a human operator as well. Therefore, mechanisms for roadside assistance without the need for human intervention are needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for roadside assistance mechanisms without the need for human intervention. Currently, human operators are needed for operating a tow vehicle, recognizing (or at least receiving a call about) a vehicle, and then towing the vehicle to safety and/or a repair shop. However, as autonomous vehicles enter the roadways, an autonomous vehicle may become stranded and/or the towing vehicle can be an autonomous vehicle itself. Human operators and/or human intervention would not be available for roadside assistance, leaving the vehicle without the ability to receive maintenance, charging, fueling or, in some circumstances, leaving the vehicle in a hazardous area (e.g., within a ditch, in the middle of a road, etc.).

To solve the above issues, systems and methods are disclosed for enabling an autonomous vehicle to provide road assistance to a vehicle. The autonomous vehicle can analyze sensor data about the vehicle captured by one or more of its sensors as it navigates a route. Based on the analysis of the sensor data, the autonomous vehicle can determine that the vehicle needs maintenance. The autonomous vehicle can proactively send a request, based on the determination, to initiate a towing mechanism to tow the vehicle. Based on receiving an acceptance of the request from the vehicle, the autonomous vehicle can activate the towing mechanism.

Figure 1:
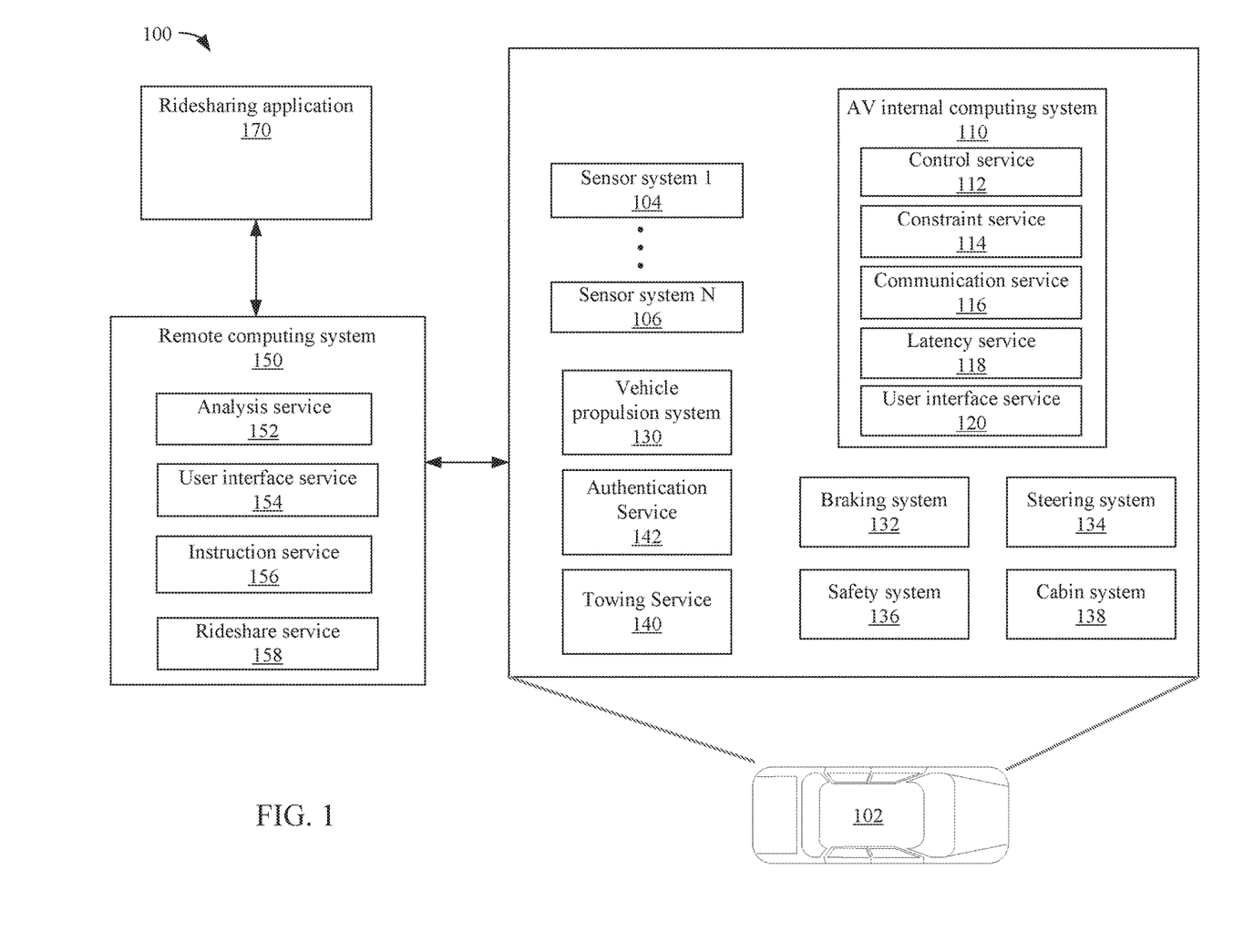
FIG. 1 illustrates an example schematic diagram of an autonomous vehicle and network environment, in accordance with some embodiments.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

In some embodiments, the communication service 116 can be configured to transmit and receive information wirelessly over a network to a remote backup service, which can then interface with towing service 140 on autonomous vehicle 102. The backup service can, for example, be a service within remote computing system 150 that can interface with autonomous vehicle 102 in response to a vehicle asking for roadside assistance (e.g., maintenance, charging, fueling, etc.). The remote backup service can send routing and price information related to towing the vehicle to towing service 140, which can initiate mutual authorization and/or authentication with the vehicle through authentication service 142.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
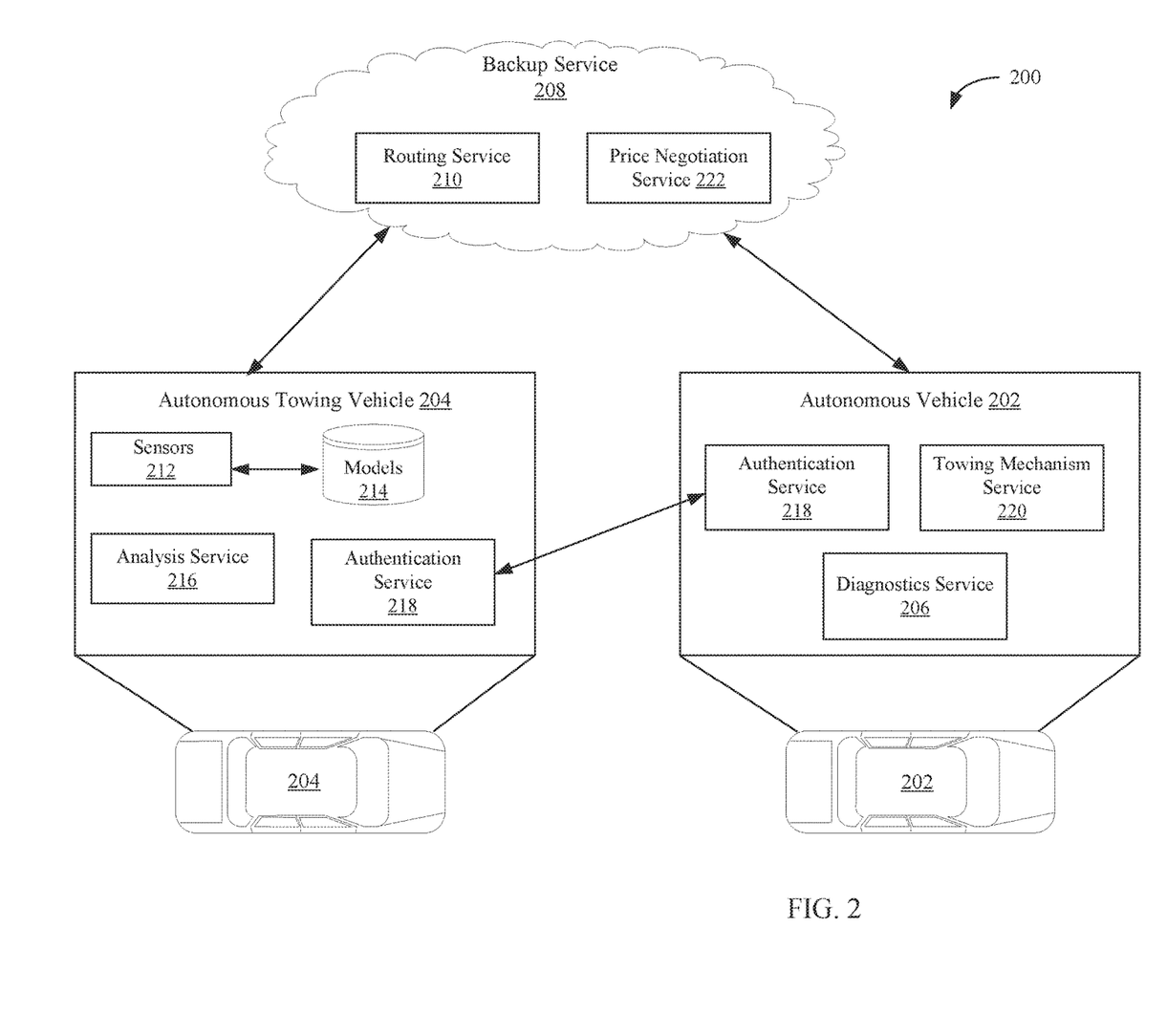
FIG. 2 illustrates an example schematic diagram of an autonomous vehicle and network environment that enables an autonomous towing vehicle to provide roadside assistance to an autonomous vehicle, in accordance with some embodiments.

FIG. 2 illustrates an example schematic diagram of an autonomous vehicle and network environment that enables an autonomous towing vehicle to provide roadside assistance to another vehicle, such as another autonomous vehicle, in accordance with some embodiments. Autonomous vehicles, once deployed, may break down and will need to be provided roadside assistance, and/or may need charging or fueling assistance. These autonomous vehicles may signal for help from a backup service, a passing towing vehicle, or may be recognized by a towing vehicle as needing assistance. A specialized autonomous vehicle, such as an autonomous towing vehicle, may respond to provide roadside assistance to the autonomous vehicle.

For example, in system 200, autonomous vehicle 202 can become stranded for a variety of reasons, such as engine failure, getting into an accident, falling into a ditch, environmental circumstances (e.g., getting stuck in mud), etc. Currently, a tow truck driven by a human operator would need to be dispatched to tow the autonomous vehicle 202 to safety or a repair service. However, instead of relying on human intervention, autonomous towing vehicle 204 would respond instead.

In some embodiments, the autonomous vehicle 202 and/or the autonomous towing vehicle 204 can recognize each other in order to initiate towing/maintenance services. This recognition can be done in several ways. For example, the autonomous vehicle 202 may broadcast a beacon (message) in a known frequency. The autonomous towing vehicle 204 could respond to this distress beacon when it passes within a line of sight of the beacon. Additionally and/or alternatively, the autonomous towing vehicle 204 could have a code (e.g., a QR code or similar) that could indicate how the autonomous vehicle 202 could contact it. Additionally and/or alternatively, the autonomous towing vehicle 204 could also transmit a signal (e.g., beacon, message, etc.) that is recognized by the autonomous vehicle 202.

In some embodiments, autonomous vehicle 202 can make determinations about whether it needs maintenance and/or how critical the issue is. Diagnostics service 206, for example, can detect an operational issue by applying one or more models to diagnostic data associated with any component used by autonomous vehicle 202 for operation. For example, diagnostics service 206 can check against software versions, valid calibration values, etc. For instance, if autonomous vehicle's 202 yaw is beyond an acceptable value or value range, then diagnostics service 206 can compare the diagnostics data against models 214 to diagnose a specific issue.

In some embodiments, based on the determination of the specific issue, the analysis of the diagnostic data can be sent to backend service 208, which can route autonomous towing vehicle 204 via routing service 210 in accordance with the determination. For example, routing service 208 can determine an appropriate response to the specific issue identified by diagnostics service 206, such as routing autonomous towing vehicle 204 to tow autonomous vehicle 202 to a specific shop, notifying and setting up maintenance, picking up a passenger, etc.

In alternative embodiments, the analysis of the diagnostic data can be sent to autonomous towing vehicle 204 directly. For instance, the autonomous vehicle 202 may signal for help to passing towing vehicles, which can be picked up by one or more sensors 212 on autonomous towing vehicle 204. Autonomous towing vehicle 204 could then determine whether it is able to tow autonomous vehicle 202 and/or forward any information received from autonomous vehicle 202 (e.g., diagnostic data) to backup service 208.

In alternative embodiments, autonomous towing vehicle 204 can determine that autonomous vehicle 202 needs assistance, and can proactively offer roadside assistance. For example, one or more sensors 212 can continuously capture data about vehicles on the road. The sensors 212 can be sensor systems such as, but not limited to, a camera sensor system, a lidar sensor system, a radar sensor system, amongst others. One or more models 214 can be applied to the sensor data to determine whether a vehicle, such as autonomous vehicle 202, needs assistance. For instance, autonomous vehicle 202 may have hazard lights on, may be stuck in the middle of the road and not moving for a period of time, display damage, or display outward signs of being involved in an accident.

In some embodiments, an analysis service 216 can identify, based on how well the sensor data fits models 214, any particular issues associated with the autonomous vehicle 202. Based on the particular issue(s), autonomous towing vehicle 204 can make a self-determination as to whether it can serve the autonomous vehicle 202.

In any case, once the autonomous towing vehicle 204 locates the autonomous vehicle 202, the autonomous towing vehicle 204 can contact the autonomous vehicle 202. A mutual authentication process via authentication service 218 can be initiated, where the autonomous vehicle 202 identifies itself and the autonomous towing vehicle 204 identifies itself as a legal towing service. For example, the mutual authentication process can begin with an exchange of authentication keys between the two autonomous vehicles. The autonomous towing vehicle 204 can generate (or the backup service can generate and then send to the autonomous towing vehicle 204) an authentication key along with a request to initiate a towing mechanism. That authentication key can be sent to the autonomous vehicle 202 for mutual authentication. An authentication key can also be received from the autonomous vehicle 202 that authenticates the autonomous vehicle 202. Communications can be established in order to initiate towing mechanism service 220 once there is confirmation from autonomous vehicle 202 that autonomous towing vehicle 204 is authenticated.

For example, the autonomous vehicle 202 and the autonomous towing vehicle 204 can authenticate themselves using one or more security mechanisms. For example, in some embodiments, the autonomous vehicle 202 and the autonomous towing vehicle 204 can derive keys using a PKI based authentication mechanism. Here, both the vehicles can identify themselves using public keys signed by a trusted certificate authority, and then both the vehicles can derive keys for securely communicating between themselves. Additionally and/or alternatively, other embodiments can involve a trusted dispatch service (see FIGS. 4 and/or 5). And in some embodiments, towing mechanism service 220 can initiate a towing mechanism that automatically attaches itself to the autonomous vehicle 202 once an acceptance of the request from the vehicle is received.

In some embodiments, the autonomous vehicle 202 can negotiate with backup service 208 about pricing of its towing services. For example, price negotiation service 222 can negotiate price with the autonomous vehicle 202 (e.g., computerized bidding), the occupants of the autonomous vehicle 202, or someone/entity that is charged with clearing the autonomous vehicle 202 from the locality. The towing mechanism can be activated once price terms that have been received by the autonomous vehicle 202 have been accepted.

Figure 3:
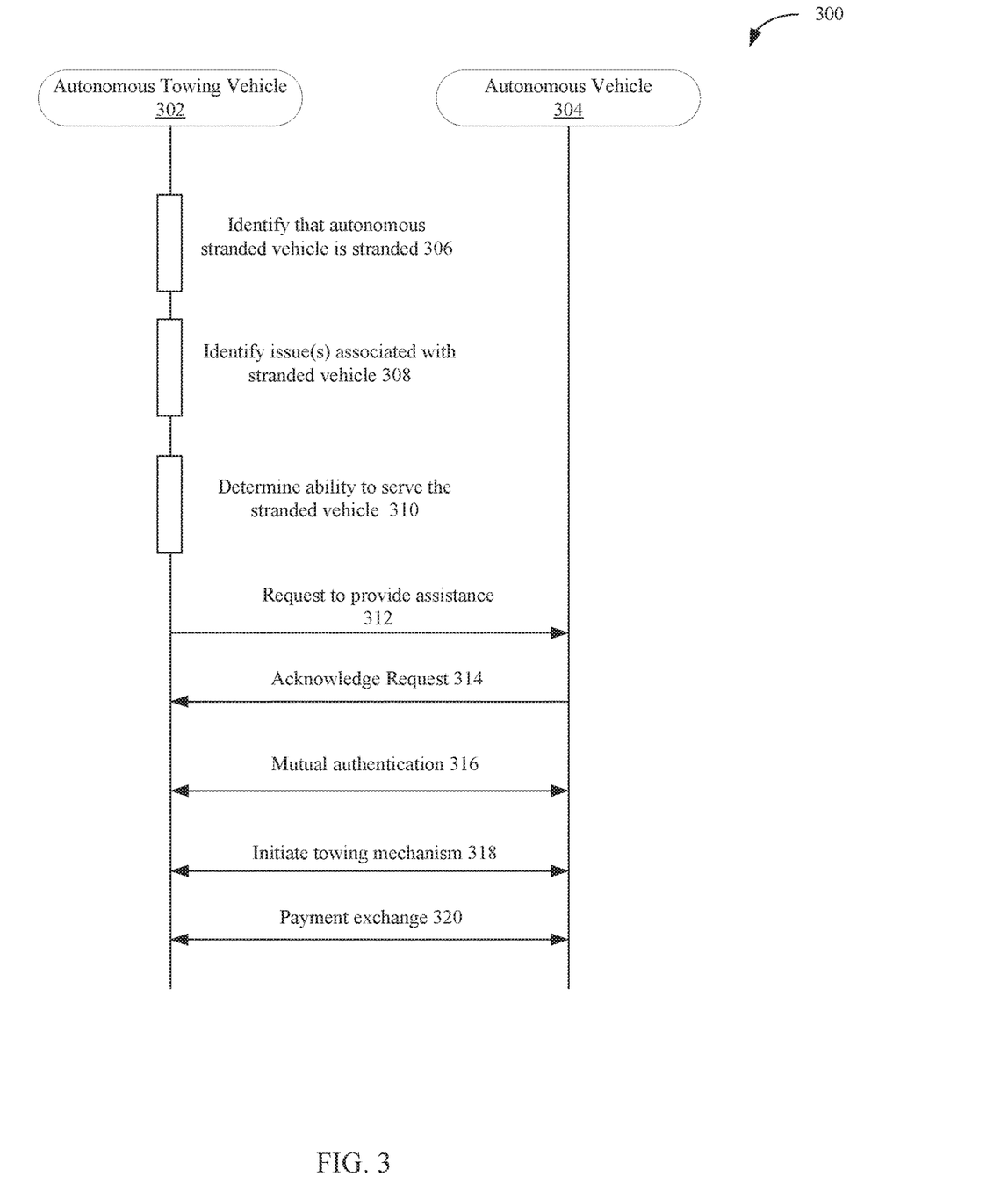
FIG. 3 illustrates a flowchart representation of an autonomous towing vehicle recognizing and offering to tow an autonomous vehicle, in accordance with some embodiments.

FIG. 3 illustrates a flowchart representation of an autonomous towing vehicle 302 recognizing and offering to tow an autonomous vehicle 304, in accordance with some embodiments. The autonomous towing vehicle 302 can identify (306) that autonomous vehicle 304 is. For example, sensors on autonomous towing vehicle 302 can identify that autonomous vehicle 304 has hazard lights on, is stuck in the middle of the road and not moving for a period of time, displays damage, or displays outward signs of being involved in an accident. Any particular issue(s) associated with autonomous vehicle 304 can be identified (308). The autonomous towing vehicle 302 can then determine (310) whether it has the ability to assist or serve autonomous vehicle 304. For example, autonomous towing vehicle 302 can analyze the sensor data about a vehicle using one or more models indicating that a vehicle needs roadside assistance. The one or more models can, for example, identify a circumstance indicating an issue being experienced by the autonomous vehicle 304. In some embodiments, this sensor data can be captured by a sensor of autonomous towing vehicle 302 while it is navigating a route.

In some embodiments, if the autonomous vehicle 304 needs fuel or charging assistance, the autonomous vehicle 304 can inform the autonomous towing vehicle 302 of those needs via a distress message, computer vision, or some other mechanism. If the autonomous towing vehicle 302 spots the autonomous vehicle 304 and realizes that it cannot provide the appropriate service, then it could call the right autonomous vehicle for service.

Based on the determination that the autonomous towing vehicle 302 can provide assistance, autonomous towing vehicle 302 can proactively send (312) a request to provide that assistance, such as a request to initiate a towing mechanism to tow the autonomous vehicle 304. The autonomous vehicle 304 can acknowledge (314) the request, and then the autonomous vehicle 304 and autonomous towing vehicle 302 can initiate (316) a mutual authentication process similar to that described in FIG. 2.

Once autonomous vehicle 304 accepts the request and mutual authentication is completed by both the autonomous vehicle 304 and autonomous towing vehicle 302, then a towing mechanism can be initiated (318). This towing mechanism may in some embodiments be an automatic process that requires no human intervention. In some embodiments, payment can then be exchanged (320) based on agreed upon terms within a price negotiation process similar to that discussed in FIG. 2.

Figure 4:
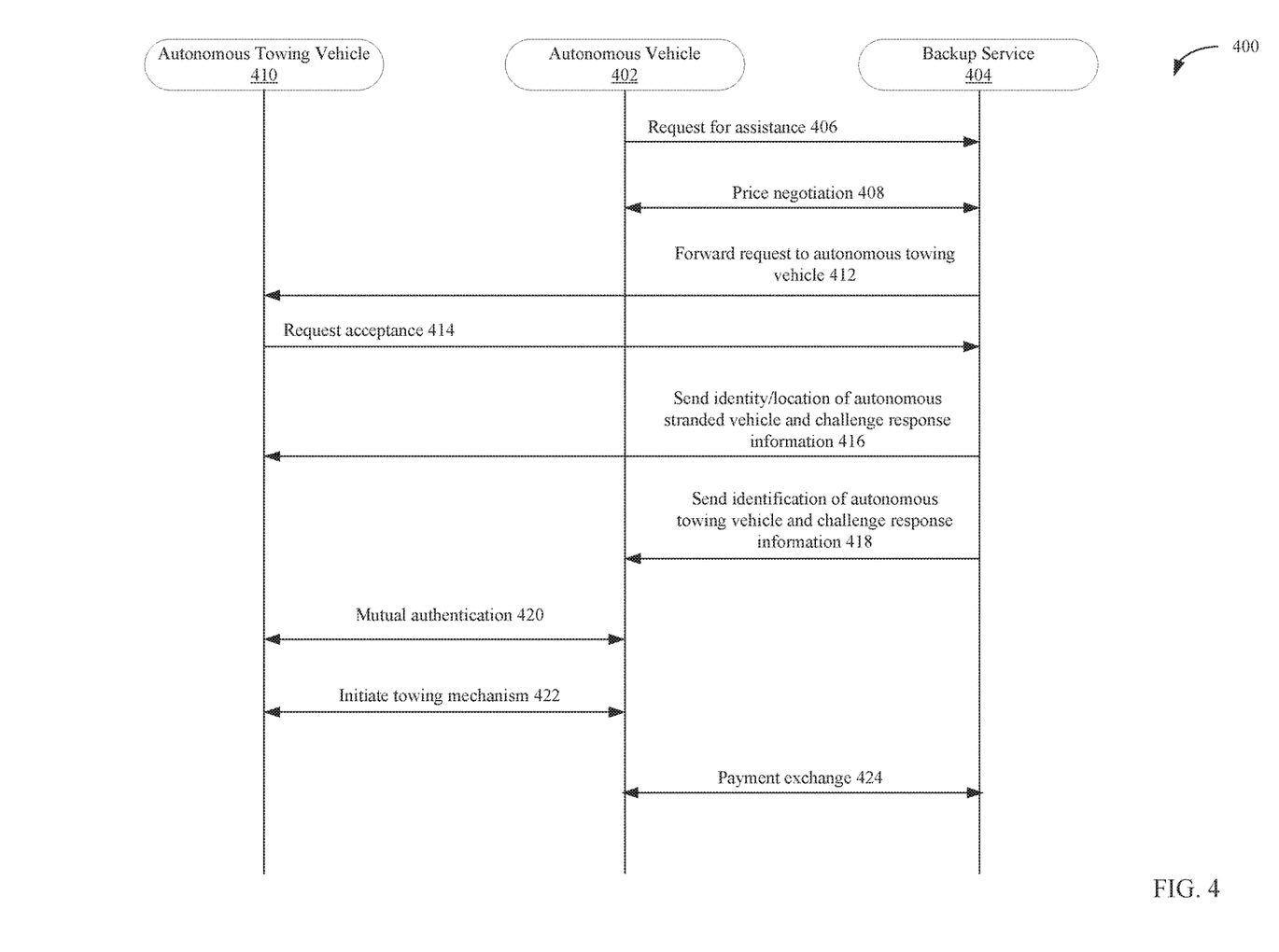
FIG. 4 illustrates a flowchart representation of an autonomous vehicle recognizing and requesting roadside assistance from a backup service, in accordance with some embodiments.
Figure 5:
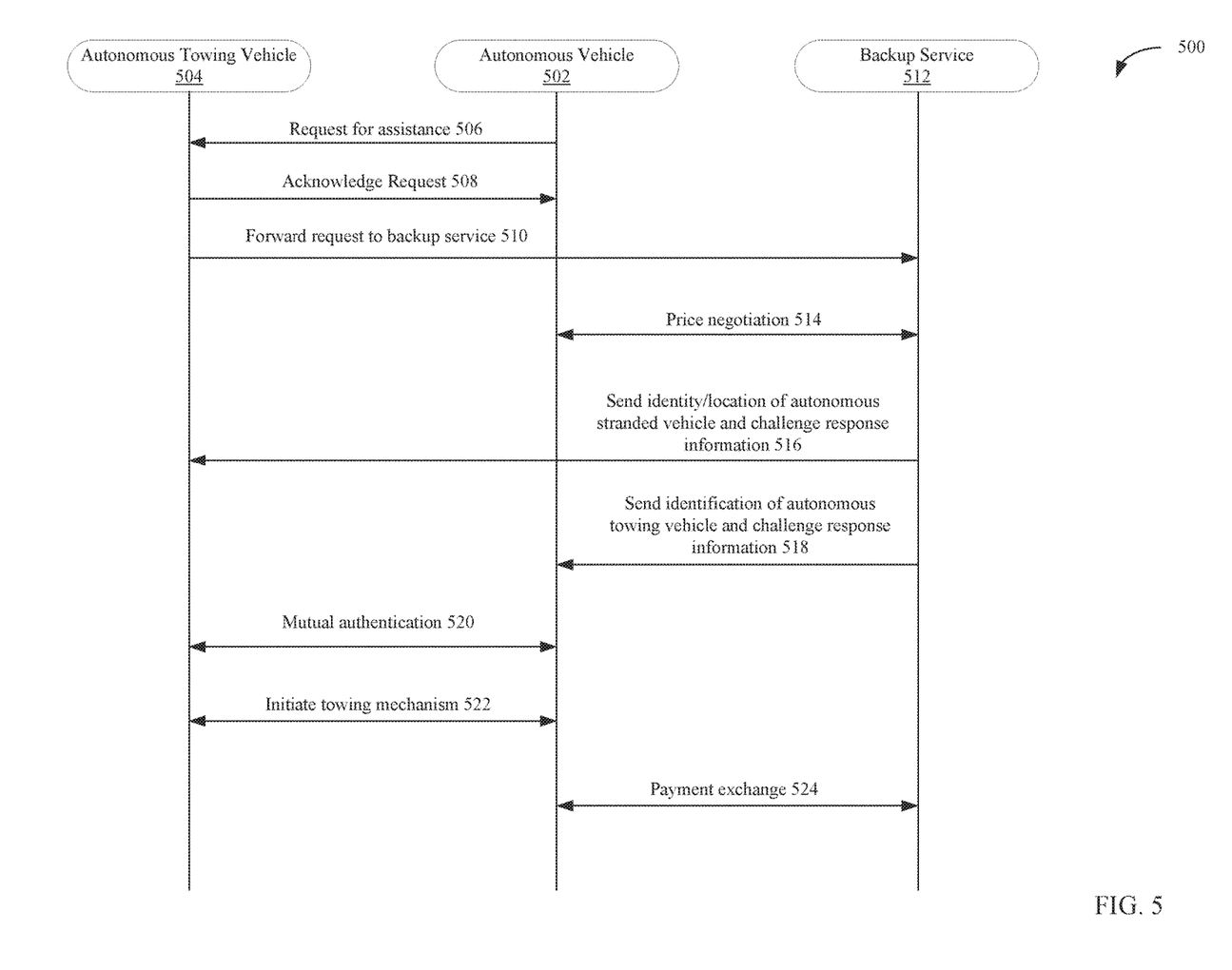
FIG. 5 illustrates a flowchart representation of an autonomous vehicle recognizing and requesting roadside assistance from an autonomous towing vehicle, in accordance with some embodiments.

FIG. 4 illustrates a flowchart representation of an autonomous vehicle 402 recognizing and requesting roadside assistance from a backup service 404, in accordance with some embodiments.

The autonomous vehicle 402 can recognize, via diagnostic data, that it is in need of roadside assistance. In response, the autonomous vehicle 402 can establish a link with backup service 404 and request (406) help. The autonomous vehicle 402 can send information about the problem with the request. For example, information about the maintenance, fuel, and/or charging needs can be included as part of the request message from the autonomous vehicle 402. The right towing vehicle can be dispatched based on the type of maintenance needed, the fuel needed (gas, fuel for fuel-cell cars, the right type of connector for electric vehicles, etc). In some embodiments, price negotiation (408) can be initiated and completed.

Once the price has been agreed to, backup service 404 can find a towing vehicle (such as autonomous towing vehicle 410) that satisfies the requirements. The backup service 404 can send the details of the autonomous towing vehicle 410 back to the autonomous vehicle 402. The autonomous vehicle 402 can accept the criteria of service provided by the autonomous towing vehicle 410 and send the acceptance over to the backup service 404.

The backup service 404 can forward (412) the request for roadside assistance to autonomous towing vehicle 410, which can accept/acknowledge (414) the request. Once acceptance has been received by backup service 404, the backup service 404 can send (416) the identity and location of autonomous vehicle 402 and challenge response information. The backup service 404 can also send (418) identification of the autonomous towing vehicle 410 and challenge response information to the autonomous vehicle 402.

Once the autonomous towing vehicle 410 reaches the autonomous vehicle 402, mutual authentication similar to that disclosed in FIG. 2 can be initiated (420). Once mutually authenticated, the towing mechanism can be initiated (422) and payment exchanged (424).

FIG. 5 illustrates a flowchart representation of an autonomous vehicle 502 recognizing and requesting roadside assistance from a passing autonomous towing vehicle 504, in accordance with some embodiments.

The autonomous vehicle 502 can recognize, via diagnostic data, that it is in need of roadside assistance. In response, the autonomous vehicle 502 can establish a link with autonomous towing vehicle 504 and request (506) help/assistance. Once autonomous towing vehicle 504 acknowledges (508) the request (or simultaneously to sending the request), the autonomous vehicle 502 can also send information about the problem with the request. The autonomous towing vehicle 504 could then forward (510) the request and information about the problem/operational issue with the request to backup service 512.

In some alternative embodiments, autonomous towing vehicle 502 can determine which operational issue is being experienced by the autonomous vehicle 502 in accordance with the circumstance identified by one or more models. Autonomous towing vehicle 502 could then be forwarded (510) to backup service 512. In some embodiments, price negotiation (514) can then be initiated and completed.

In some embodiments, based on the information about the operational issue, the backup service 512 can select a repair service location to tow the vehicle. The backup service 512 can then send (516) the identity and location of autonomous vehicle 502 and challenge response information. The backup service 512 can also send (518) identification of the autonomous towing vehicle 504 and challenge response information to the autonomous vehicle 502.

Once the autonomous towing vehicle 504 reaches the autonomous vehicle 502, mutual authentication similar to that disclosed in FIG. 2 can be initiated (520). Once mutually authenticated, the towing mechanism can be initiated (522) and payment exchanged (524).

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
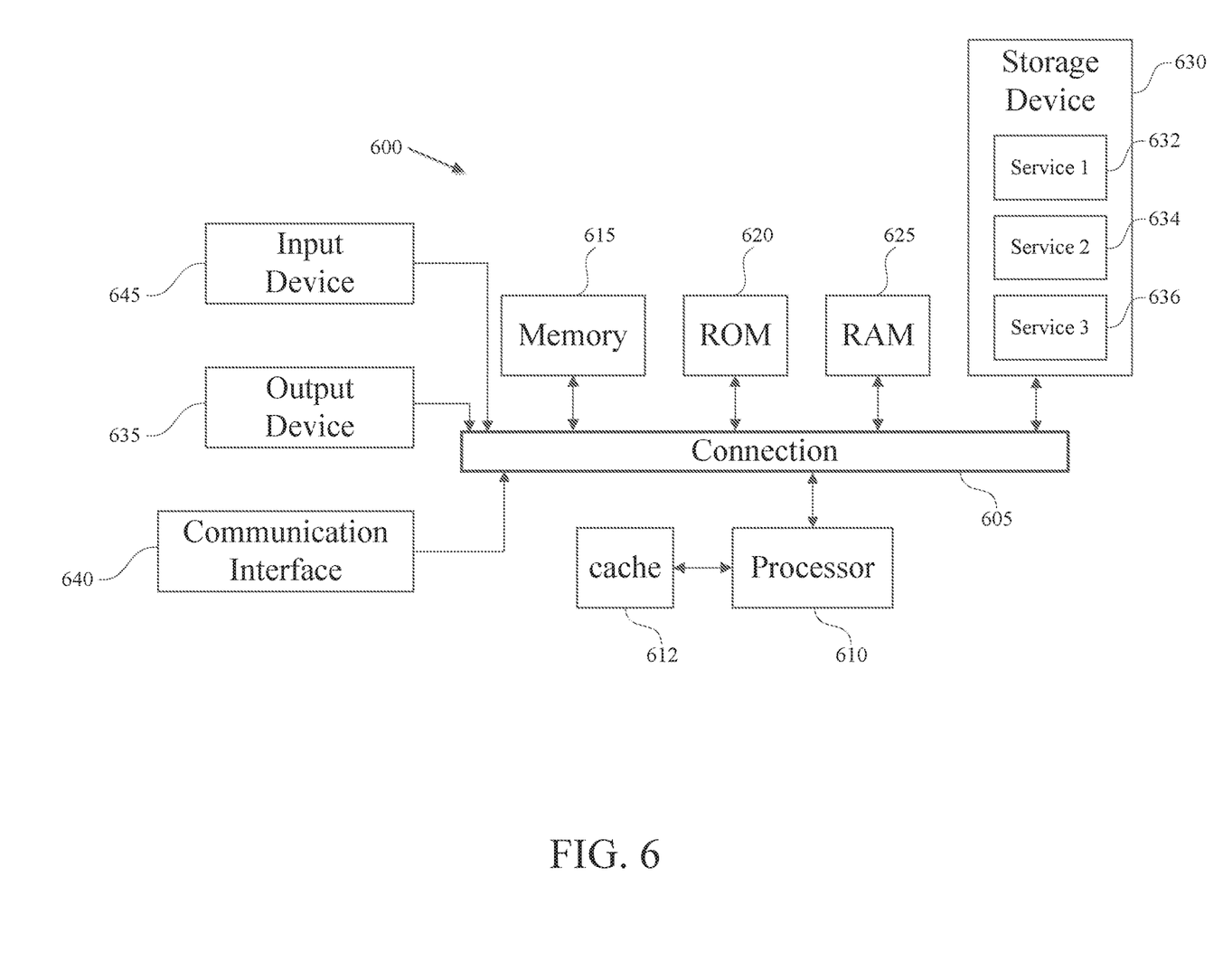
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof as shown in FIGS. 1 and 2 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of towing vehicles comprising:
    analyzing sensor data about a vehicle, wherein the sensor data is captured by a sensor of an autonomous vehicle navigating a route;
    determining, based on analyzing the sensor data, that the vehicle needs maintenance, wherein the determination that the vehicle needs maintenance is based on the analysis of the sensor data being in accordance with one or more models that identify a circumstance indicating an issue being experienced by the vehicle;
    based on the determination, proactively sending a request to initiate a towing mechanism to tow the vehicle; and
    activating the towing mechanism based on receiving an acceptance of the request from the vehicle.

2. The method of claim 1, the method further comprising:
    determining an operational issue in accordance with the circumstance identified by the one or more models;
    determining an ability to take an action with respect to the operational issue; and
    requesting, from the vehicle, authorization to initiate the towing mechanism.

3. The method of claim 1, the method further comprising:
    sending, within the request to initiate the towing mechanism, a request for information about an operational issue experienced by the vehicle;
    based on receiving the information about the operational issue, sending the information to a dispatch service; and
    receiving, from the dispatch service, a selected repair service location to tow the vehicle.

4. The method of claim 1, the method further comprising:
    receiving, from a dispatch service, a first authentication key along with the request to initiate the towing mechanism;
    sending the first authentication key to the vehicle for mutual authentication;
    authenticating the vehicle based on a second authentication key received from the vehicle; and
    based on receiving, from the vehicle, confirmation that the autonomous vehicle is also authenticated, establishing communications in order to initiate the towing mechanism.

5. The method of claim 1, wherein the towing mechanism automatically attaches itself to the vehicle once an acceptance of the request from the vehicle is received.

6. The method of claim 1, wherein the towing mechanism is activated once price terms that have been received by the vehicle have been accepted.

7. A system comprising:
    one or more sensors of an autonomous vehicle; and
    a processor for executing instructions stored in memory, wherein execution of the instructions by the processor executes:
        analyzing sensor data about a vehicle, wherein the sensor data is captured by a sensor of an autonomous vehicle navigating a route;
        determining, based on analyzing the sensor data, that the vehicle needs maintenance, wherein the determination that the vehicle needs maintenance is based on the analysis of the sensor data being in accordance with one or more models that identify a circumstance indicating an issue being experienced by the vehicle;
        based on the determination, proactively sending a request to initiate a towing mechanism to tow the vehicle; and
        activating the towing mechanism based on receiving an acceptance of the request from the vehicle.

8. The system of claim 7, wherein execution of the instructions by the processor further executes:
    determining an operational issue in accordance with the circumstance identified by the one or more models;
    determining an ability to take an action with respect to the operational issue; and
    requesting, from the vehicle, authorization to initiate the towing mechanism.

9. The system of claim 7, wherein execution of the instructions by the processor further executes:
    sending, within the request to initiate the towing mechanism, a request for information about an operational issue experienced by the vehicle;
    based on receiving the information about the operational issue, sending the information to a dispatch service; and
    receiving, from the dispatch service, a selected repair service location to tow the vehicle.

10. The system of claim 7, wherein execution of the instructions by the processor further executes:
    receiving, from a dispatch service, a first authentication key along with the request to initiate the towing mechanism;
    sending the first authentication key to the vehicle for mutual authentication;
    authenticating the vehicle based on a second authentication key received from the vehicle; and
    based on receiving, from the vehicle, confirmation that the autonomous vehicle is also authenticated, establishing communications in order to initiate the towing mechanism.

11. The system of claim 7, wherein the towing mechanism automatically attaches itself to the vehicle once an acceptance of the request from the vehicle is received.

12. The system of claim 7, wherein the towing mechanism is activated once price terms that have been received by the vehicle have been accepted.

13. A non-transitory computer readable medium comprising instructions, the instructions, when executed by a computing system, cause the computing system to:
    analyze sensor data about a vehicle, wherein the sensor data is captured by a sensor of an autonomous vehicle navigating a route;
    determine, based on analyzing the sensor data, that the vehicle needs maintenance, wherein the determination that the vehicle needs maintenance is based on the analysis of the sensor data being in accordance with one or more models that identify a circumstance indicating an issue being experienced by the vehicle;

based on the determination, proactively send a request to initiate a towing mechanism to tow the vehicle; and activate the towing mechanism based on receiving an acceptance of the request from the vehicle.

14. The non-transitory computer readable medium of claim 13, the instructions further causing the computing system to:

determine an operational issue in accordance with the circumstance identified by the one or more models;

determine an ability to take an action with respect to the operational issue; and request, from the vehicle, authorization to initiate the towing mechanism.

15. The non-transitory computer readable medium of claim 13, the instructions further causing the computing system to:

send, within the request to initiate the towing mechanism, a request for information about an operational issue experienced by the vehicle;

based on receiving the information about the operational issue, send the information to a dispatch service; and receive, from the dispatch service, a selected repair service location to tow the vehicle.

16. The non-transitory computer readable medium of claim 13, the instructions further causing the computing system to:

receive, from a dispatch service, a first authentication key along with the request to initiate the towing mechanism;

send the first authentication key to the vehicle for mutual authentication;

authenticate the vehicle based on a second authentication key received from the vehicle; and based on receiving, from the vehicle, confirmation that the autonomous vehicle is also authenticated, establish communications in order to initiate the towing mechanism.

17. The non-transitory computer readable medium of claim 13, wherein the towing mechanism automatically attaches itself to the vehicle once an acceptance of the request from the vehicle is received.

* * * * *